Sept. 20, 1932.   C. F. M. VAN BERKEL   1,878,070
SLICING MACHINE
Filed Nov. 12, 1926
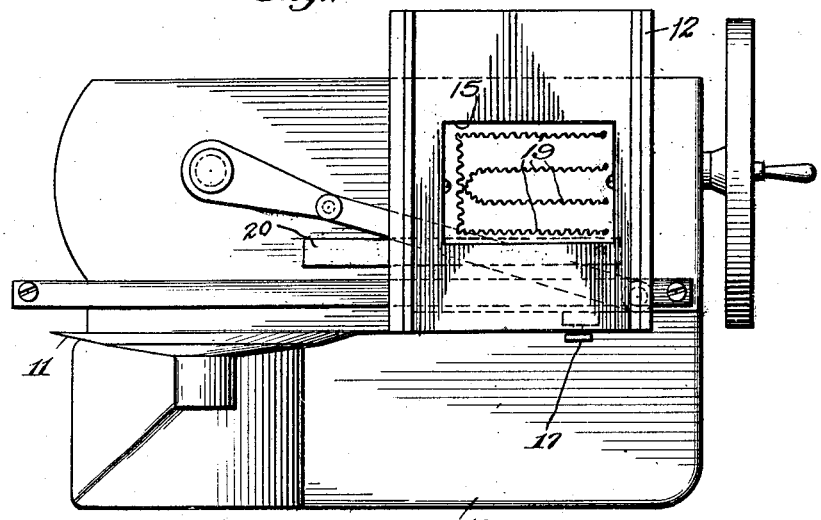
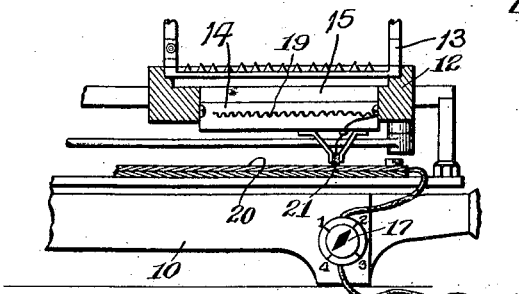
Inventor
Cornelis F. M. van Berkel
By Nissen & Crane
attys.

Patented Sept. 20, 1932

1,878,070

UNITED STATES PATENT OFFICE

CORNELIS F. M. VAN BERKEL, OF WASSENAAR, NETHERLANDS, ASSIGNOR TO U. S. SLICING MACHINE COMPANY, OF LA PORTE, INDIANA, A CORPORATION OF INDIANA

SLICING MACHINE

Application filed November 12, 1926, Serial No. 148,034, and in Germany July 9, 1926.

This invention relates to machines for slicing meat or other material which is affected by changes of temperature, and has for its object the provision of such a machine in which the material to be sliced may be raised to the best temperature for easy slicing.

The invention is exemplified in the combination and arrangement of parts shown in the accompanying drawing and described in the following specification, and it is more particularly pointed out in the appended claims.

In the drawing:—

Fig. 1 is a plan view of a slicing machine embodying my invention;

Fig. 2 is a cross-section through the meat table shown in Fig. 1 showing the manner in which the heating element is mounted thereon.

Many kinds of meat are difficult to slice when cold but, when raised to the requisite temperature, slice more readily. It is inconvenient to attempt to warm a piece of meat and then clamp it to the slicing machine each time slices are to be severed. The present invention provides means for heating the meat while clamped in position on the carriage of the slicing machine. Various heating mediums may be employed, such as electricity, gas, hot water, steam, etc., and the invention is applicable to various forms of slicing machines besides the particular one shown in the drawing which is given by way of illustration only.

In the drawing, the numeral 10 designates the base of a slicing machine, and 11 indicates the knife used for cutting slices from the substance. A table 12 reciprocates past the edge of said knife and carries the substance into engagement with the knife. The table is provided with the usual feed plate 13, upon which the substance is clamped, and fed toward the cutting plane of the knife. A heating device 14 provided with the heating elements 19 is arranged within a recess 15 in the table and is connected by means of a sliding contact 21 and plate 20 to a switch 17 interposed in the main line circuit from any suitable source of power. The switch 17 is arranged to vary the heating capacity of the heating element 19. In this way, the heat produced by the heating element may be regulated to produce the most desirable temperatures. The heat passes upwardly through the opening 15 into engagement with the feed plate 13 and is transmitted through the feed plate to the material mounted thereon.

With this arrangement, the substance to be sliced is heated by the heating element during the entire extent of the travel of the table 12, and the substance may be heated to the desired temperature by regulating the switch 17.

Obviously, those skilled in the art to which this invention pertains may make various changes in the particular construction and arrangement shown in the drawing without departing from the spirit of the invention as defined by the accompanying claims.

I claim:

1. In a meat slicing machine, a sliding table, said table having an opening therethrough, a meat supporting plate mounted over said opening, and a meat heater mounted in said opening and beneath said plate.

2. A slicing machine comprising a movable support for holding material to be sliced, and a heating element on said support adapted to control the temperature of material placed thereon.

3. A slicing machine comprising a movable support for the material to be sliced, a recess in said support, and a heating means arranged in said recess adapted to heat the material when it is placed on the support.

4. A slicing machine comprising a reciprocating carriage for supporting the material to be sliced, a recess in said carriage, and an electrical heating element mounted in said recess and adapted to heat the material when it is placed upon the carriage.

5. A slicing machine comprising a reciprocating member for the material to be sliced, a recess in said member, an electrical heating element arranged in said recess adapted to heat the material when it is placed on the member, and means for connecting the heating element to a source of electrical energy.

6. A slicing machine comprising a stationary support, a carriage movably supported thereon for holding the material to be sliced, a recess in said carriage, a heating element in said recess adapted to heat the material which is to be sliced, a heating medium therefor, and co-operating means on the support and carriage forming a connection to convey the heating medium from the stationary support to the reciprocating carriage.

7. A slicing machine comprising a base member, a reciprocating support thereon for supporting the material to be sliced, an opening in said carriage, an electrical heating unit arranged in said opening and adapted to heat the material which is to be sliced, a source of electrical energy to operate the heating unit, and co-operating means on the support and carriage forming a connection to convey the electrical energy to said heating unit from said source of electrical energy.

8. A slicing machine comprising a stationary support, a reciprocating carriage on said support adapted to hold the material to be sliced, a recess in said carriage, an electrical heating element arranged in said recess and adapted to heat the material which is to be sliced, means for conveying electrical energy to said support, and contact members on said support and carriage adapted to form a connection therebetween for conveying the electrical energy from said support to said carriage.

9. A slicing machine comprising a work support, a base member upon which said work support reciprocates, a heating element mounted within a recess in said support, and co-operating sliding members on said support and base connected to the heating element and a source of electrical energy respectively, said sliding members remaining in engagement during the reciprocation of the support on said base.

10. In a slicing machine, the combination with a slicing knife, of a base, a support movably mounted relatively thereto, a heating element on said support for heating the material which is adapted to be sliced by the machine, and co-operating means on said support and base adapted to convey a heating medium to the heating element during the reciprocation of said support.

In testimony whereof I have signed my name to this specification on this twentieth day of October A. D. 1926.

CORNELIS F. M. van BERKEL.